Jan. 16, 1934.  M. G. CORNET  1,943,370
COUPLING FOR VEHICLES
Filed Jan. 15, 1931   3 Sheets-Sheet 1
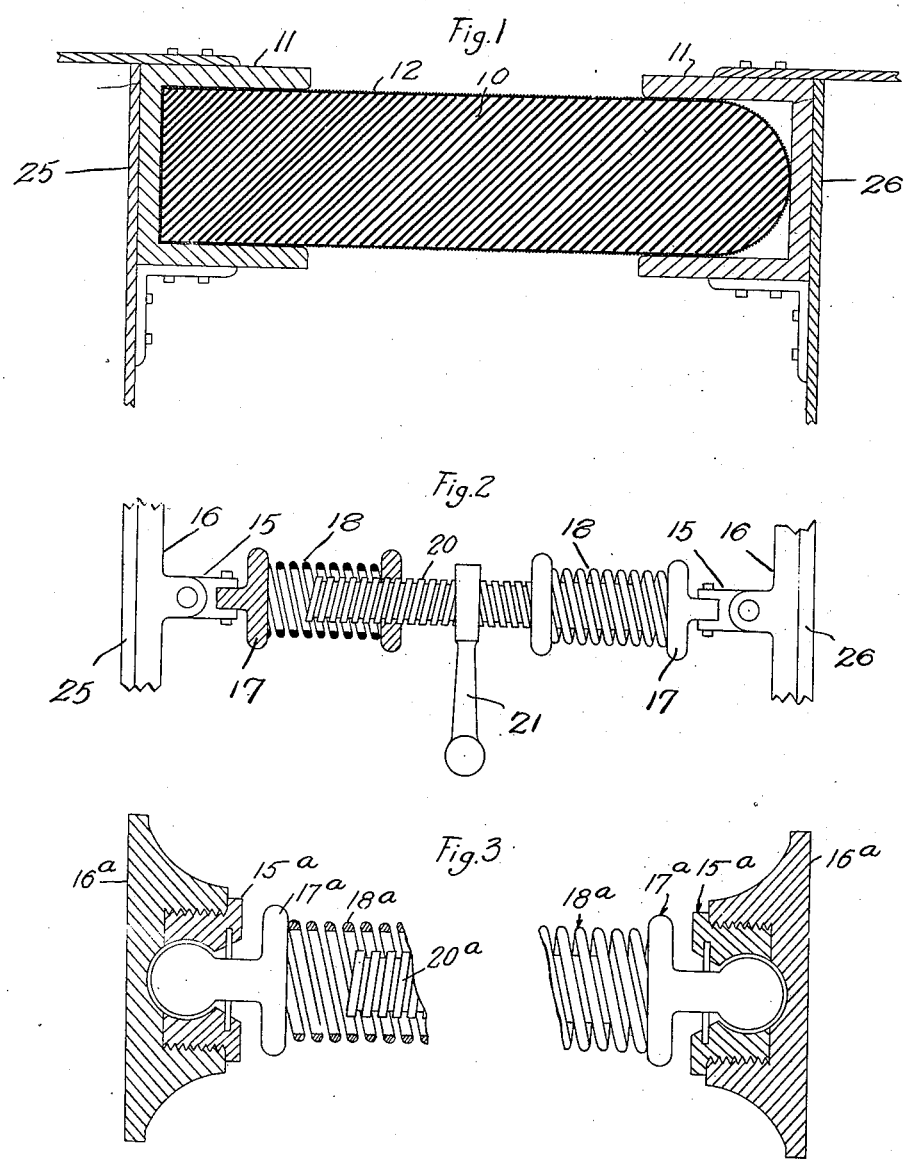

Jan. 16, 1934.  M. G. CORNET  1,943,370
COUPLING FOR VEHICLES
Filed Jan. 15, 1931  3 Sheets-Sheet 2
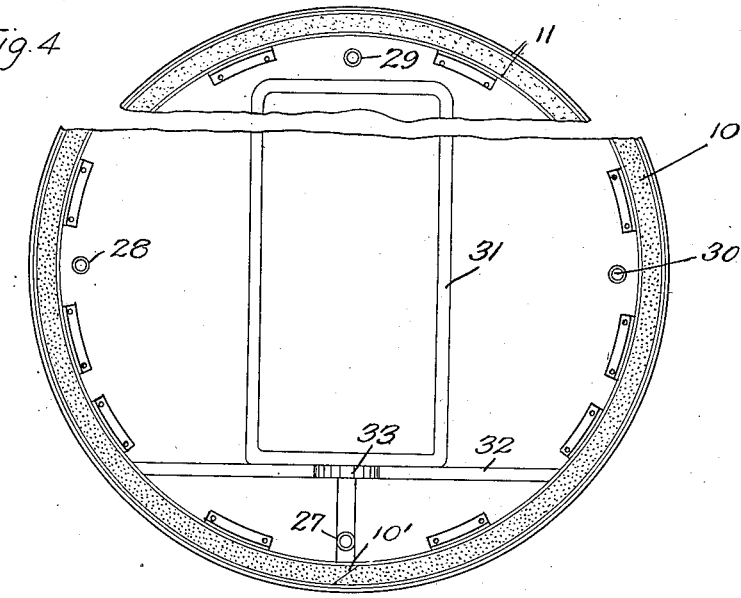
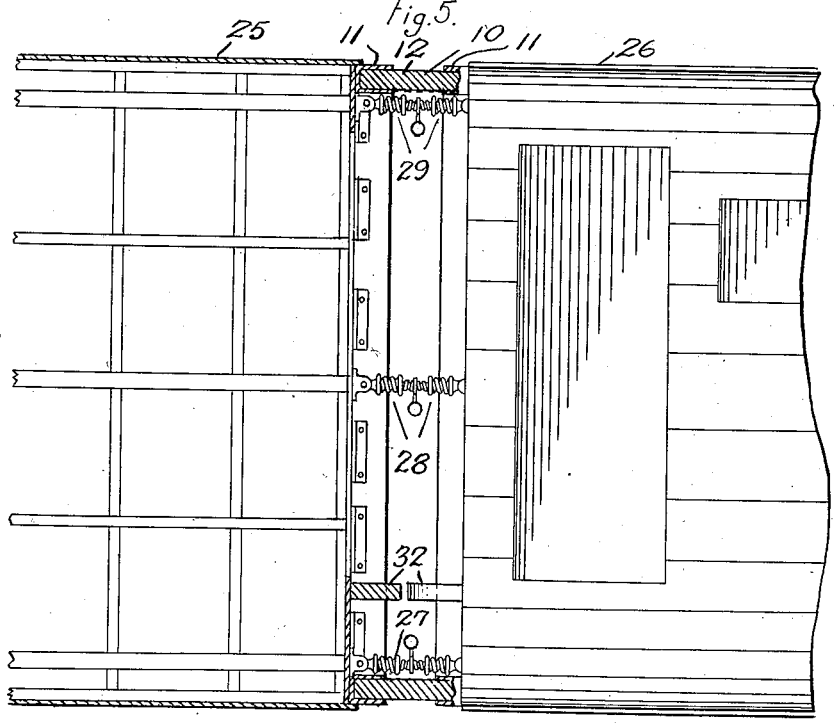
Inventor
Manuel G. Cornet
by Martin T. Fisher
Attorney Patented Jan. 16, 1934

1,943,370

UNITED STATES PATENT OFFICE 1,943,370

COUPLING FOR VEHICLES

Manuel Gomis Cornet, Madrid, Spain

Application January 15, 1931, Serial No. 508,960, and in Spain January 21, 1930

4 Claims. (Cl. 213—9)

This invention relates to the coupling of vehicles and particularly to an elastic coupling for the vehicles of trains, whereby smooth starting and stopping and a decreased air resistance is provided.

The advantages entailed by linking up vehicles, particularly railway vehicles, by elastic couplings are many, both from the technical point of view and from the standpoint of the comfort of the passengers.

The discomfort caused to passengers due to imperfect coupling of the vehicles is quite well known and is particularly noticeable when small vehicles, such as those used on urban tramways, are employed.

A perfectly elastic coupling between vehicles of a train will enable the train to run smoothly without uncomfortable jerks and, in addition, in the case of lines over which large vehicles cannot run, the vehicle coupling forming an object of this application will enable several short vehicles to be coupled so as to provide the advantages of long vehicles. This is particularly important where the lines have sharp curves or levels, and pronounced gradients have to be bounded by closely joined parabolas.

The coupling which forms an illustrative embodiment of this invention solves this important problem by the application between vehicle ends of a rubber band or strip of a special shape and a practically continuous surface between any two vehicles is thereby obtained. Aerodynamic experiments, which need not be set forth here as they are well known, have shown how important the shape of vehicles is for reducing the resistance of the air. A stream-line body helps the air currents to glide past the surface instead of striking against the front planes, thus reducing the resistance and accordingly the traction required.

As regards comfort, this elastic coupling provides advantages of importance, such as smooth running and the absence of jerks and jolts when the train starts and stops, these shocks being considerably absorbed. The passage from one vehicle to another is rendered commodious because the rubber band completely closes the space between any two vehicles and the passengers may pass from one vehicle to another while being completely enclosed. The coupling further permits the use of smaller vehicles.

In accordance with this invention, any two vehicles are coupled by fitting a substantially circumferential strip or band of vulcanized rubber or other suitable elastic substance between the ends of said vehicles. To hold the strip or band in place between the ends of the vehicles, each vehicle is preferably provided at its end to be coupled with a substantially circumferential channeled rim, preferably of metal, said rim being secured to the vehicle end. This rim preferably follows the outer contour of the vehicle. The strip or band is fitted into the channels of adjacent rims between any two vehicles and the vehicles are then secured together such as by a screw coupler or couplers or other means whereby the elastic strip or band is placed under compression.

These and other objects will become more apparent to persons skilled in this particular art from the description in the specification taken in connection with the accompanying drawings, in which Figure 1 is a sectional view shown broken of a portion of an elastic band held between channeled metallic rims attached to adjacent vehicle ends;

Figure 2 is an elevation partly in section and shown broken of a suitable form of resilient screw coupler for positively coupling adjacent vehicles together;

Figure 3 is an elevation partly in section and shown broken of another form of suitable resilient screw coupler;

Figure 4 is an end view of a vehicle shown broken and illustrating a circumferential elastic band in position in a channeled rim attached to the vehicle end and also illustrating suitable positions for the resilient screw couplers;

Figure 5 is an elevation partly in section and shown broken of the adjacent ends of two vehicles coupled in a manner to illustrate the invention, one vehicle end being shown in full and the other vehicle end illustrated by the framework only;

Figure 6:
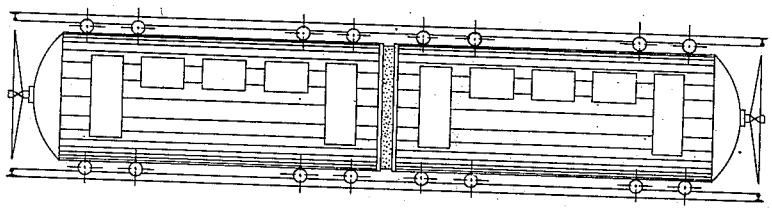
Figure 6 is an elevation of a train having the invention applied thereto.
Figure 7:
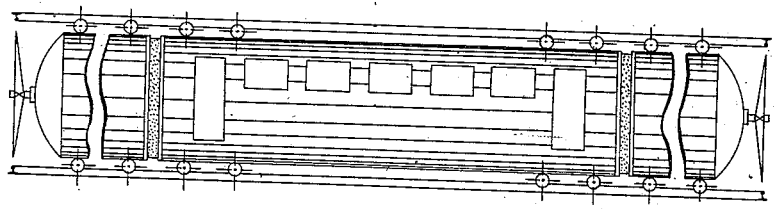
Figure 7 is an elevation shown broken of another train having the invention applied thereto.

In the embodiment of the invention shown in the drawings which has been chosen for the purposes of illustration, in Figure 1 is shown in section one side of an elastic band 10. Band 10 is shown in full in Figure 4 and as illustrated comprises a continuous strip of a suitable elastic substance such as rubber, the ends being overlapped as illustrated at 10'. In Figure 5 band 10 is shown with its side edges confined in the channels of rims 11 attached to the ends of adjacent vehicles 25 and 26. The depth of the channels in rims 11, as well as the thickness of the band 10 and the corresponding width of the channel in rim 11, may be made of any size according to the uses to which the invention is to be put.

To facilitate the fitting of the band 10 in the channels of the rims 11, one of the edges of the band 10 may be given a shape conforming to that of the channel into which it will be inserted and the edge may be secured in said channel, for instance by means of a suitable cement. The other edge of the band 10 may be rounded as illustrated so as to facilitate its entrance into the channel of the other rim 11.

Band 10, if made of rubber, is preferably molded and vulcanized, and may be provided with a cotton or other textile covering 12. Cover 12 may be secured to band 10 during the vulcanization thereof. Cover 12 will preserve the rubber from the elements and other possible sources of injury and may be painted the color of the vehicles. Cover 12 will not, of course, impair the elasticity of the band 10.

Any suitable resilient coupler may be provided for joining adjacent vehicles together and for normally confining band 10 under compression between the adjacent ends of adjacent vehicles.

Suitable couplers are shown in Figures 2 and 3. These couplers have their opposite ends attached to adjacent vehicle ends, each coupler end 16 or 16a as the case may be being provided with means for universal movement as illustrated at 15 in Figure 2 and 15a in Figure 3, each universal joint or ball and socket arrangement as the case may be having a member 17 or 17a to which a spring member 18 or 18a is attached. Spring members 18 or 18a are joined and tensioned by means of screw spindles 20 or 20a by rotation of an arm shown at 21 in Figure 2. By means of rotation of arm 21 the couplers illustrated in Figures 2 and 3 may be tightened to any desired degree, thereby placing any desired degree of compression upon the band 10.

A coupler to absorb the main tractive effort may be placed in the usual position between adjacent vehicles as illustrated at 27 in Figure 4. Additional couplers may be distributed circumferentially between adjacent vehicle ends as illustrated at 28, 29 and 30.

It will be obvious that the amount of traction transmitted through any coupler from one vehicle to the other will be a function of the tension of its springs 18.

With the couplers positioned at 27, 28, 29 and 30, or otherwise, the band 10 is normally secured under compression between the vehicle ends. The vehicles may have end doors as illustrated at 31 in Figure 4 and each vehicle may be provided with a platform 32 of a width sufficient to bridge the gap between the ends of the vehicles by cooperating with the platform 32 of the adjacent vehicle as illustrated in Figure 5. Each platform 32 may be provided with a cut out portion 33 which will provide an opening between adjacent vehicles by means of which the coupler at 27 may be manipulated. Access to the couplers positioned at 28, 29 and 30 may be obtained by standing on platforms 32 between vehicle ends.

I claim:

1. In a device of the kind described and in combination, a pair of vehicles, and means for coupling said vehicles together, said means comprising a ring-like elastic member disposed between the adjacent ends of said vehicles and in contact therewith, and coupler means for holding said vehicles together and against said elastic member.

2. In a device of the kind described and in combination, a pair of vehicles, and means for resiliently coupling said vehicles together, said means comprising a substantially annular elastic member disposed between the ends of said vehicles and enclosing the space therebetween, and coupler means for holding said vehicles resiliently together and against said elastic member.

3. In a device of the kind described and in combination, a pair of vehicles, and means for coupling said vehicles together, said means comprising a ring-like elastic band disposed between the ends of said vehicles, said band enclosing the area between said vehicles and having an outer contour substantially conforming to the outer contour of the bodies of said vehicles at their ends, and means for holding said vehicles together and against said elastic band.

4. In a device of the kind described and in combination, a train having a pair of coaches, and means for coupling said coaches together, said means comprising a substantially closed annular-like rubber band disposed between the adjacent ends of said coaches, said rubber band enclosing the area between said adjacent ends and having an outer contour conforming to the outer contour of the bodies of said coaches, means on said coach ends for holding said rubber band in position, and a plurality of couplers distributed circumferentially between the ends of said coaches, said couplers adapted to resiliently hold said coaches together and against said rubber band.

MANUEL GOMIS CORNET.